Patented Aug. 27, 1935

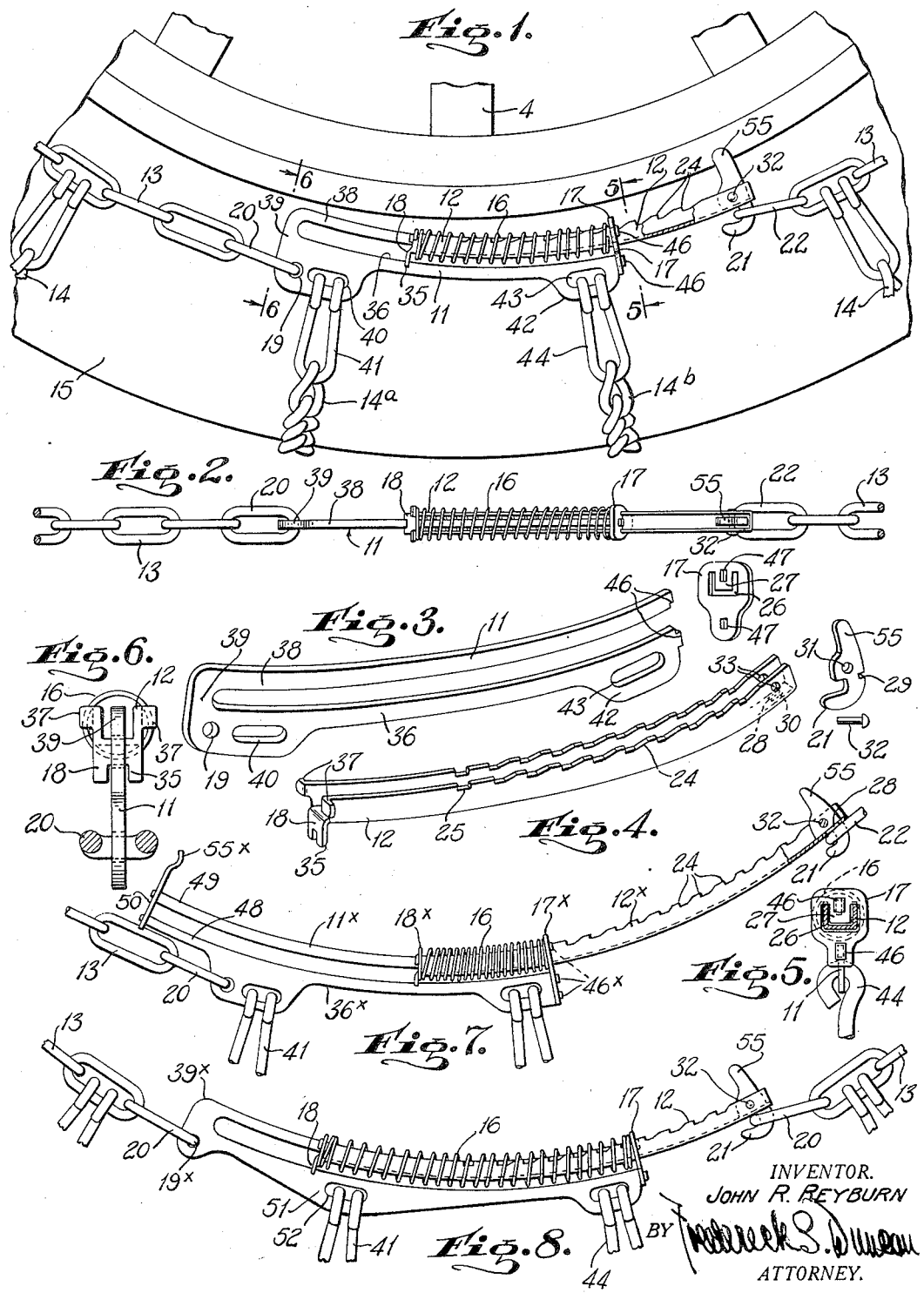

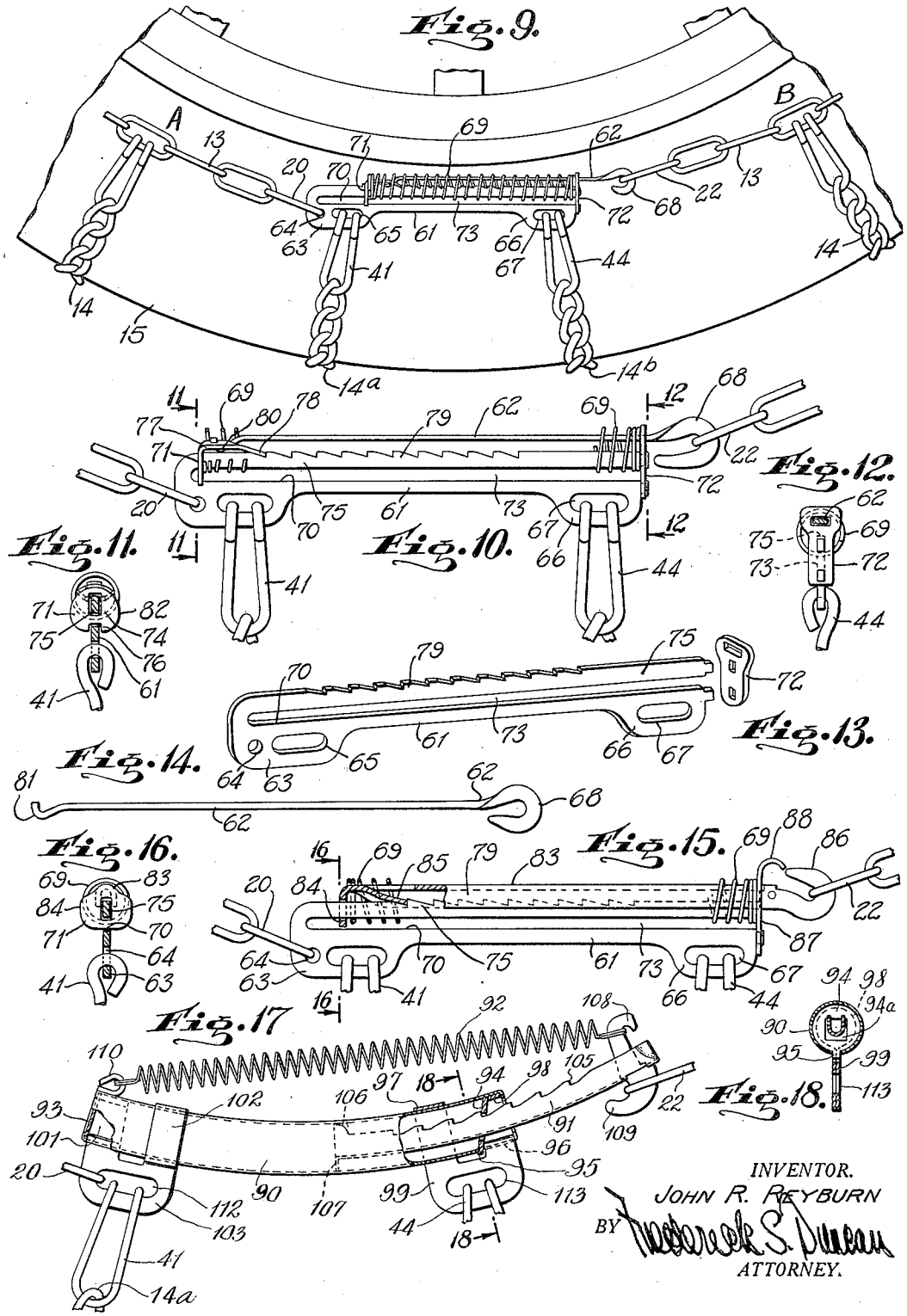

2,012,404

UNITED STATES PATENT OFFICE 2,012,404

ADJUSTING AND TIGHTENING DEVICE FOR TIRE CHAINS

John R. Reyburn, Fairfield, Conn., assignor to American Chain Company, Inc., a corporation of New York Application August 15, 1933, Serial No. 685,214

22 Claims. (Cl. 152—14)

The present application is a continuation in part of my copending application, Serial No. 503,187, filed December 18, 1930, which application was allowed November 30, 1932.

The invention relates to anti-skid chains for automobile tires, and more specifically to devices for adjusting tire chains automatically upon the tires and maintaining them in uniformly draped, snugly fitting position thereon after their initial emplacement by the user.

The average user of a tire chain usually places the chain upon the tire rather loosely, whether from lack of the skill necessary to accomplish a proper fitting of the chain, or from haste, or carelessness, or ignorance as to the desirability of having the chain uniformly draped, in order to secure its maximum efficiency in operation. By uniform draping of a tire chain its period of usefulness may be tripled, for a loose chain will break after relatively short use with the car running at a given speed, as compared with the performance of a uniformly draped chain.

Even when using more than average skill, moreover, it is difficult to accomplish the draping with a desirable degree of uniformity, by a single manual operation, and accordingly, to avoid repeated manual adjusting operations, use is made commonly of adjusting devices acting automatically to draw the tire chain taut upon the tire.

Conventional chain adjusting devices, of the type which depend upon the tension of a spring or springs to take up the slack of the chain, permit slack to occur under the centrifugal force which develops at speeds upwards of 25 miles per hour, and at 30 miles an hour the spring effect completely disappears so far as any useful purpose is served.

If the springs be very strong, they tend to make the chains bite into the tire, and so prevent the creeping which is an essential characteristic of a properly fitted tire chain.

Various forms of devices have been proposed for taking up the slack of tire chains by means of a spring, or springs, and for holding the draped chain positively to prevent further development of slack, but such devices have failed to come into general use, because of undue complexity or expense, or on account of their unreliability in service, or lack of a sufficient degree of sensitiveness in action.

The general object of the present invention is to provide a tire chain with an adjusting device or system of devices which may, and preferably will, form an element of the tire chain and which will act automatically, immediately upon the start of the car, to take up the slack and drape the tire chain uniformly upon the tire before the car reaches a speed of say forty miles an hour, and will thereafter maintain the tire chain in such snug position as to obtain effective service of the tire chain for its maximum mileage, whatever the speed of the car.

Among more particular objects of the invention is the provision of an automatically acting device or system of such devices which operates to take up the slack in successive step-by-step operations acting in the same direction, each device being so constructed as to prevent positively any retrograde movements of the parts in the opposite direction, the aggregate tightening effect extending over a range of several inches; also the provision of a device of what may be termed the "one-way adjuster" type which will take the place of the conventional connecting hook for connecting the ends of a side chain, in a tire chain, and will preferably not cause relative displacement of the cross-chains relatively to each other, except only the two cross-chains adjacent to the respective ends of the side chain.

Still another object of the invention is to provide a device of this type with means adapted to prevent escape, from the adjuster, of the connected link at the free end of a side chain in case the slack occurring in the tire chain so equipped happens to exceed the adjustive range of the device.

Another object is to provide an adjusting device of a sturdy but simple and inexpensive construction, having few operating parts, and in which a single coil spring acts on a pair of relatively sliding members, tending to draw the ends of a side chain toward each other and moving the cross-chains thereto attached into uniformly draped operative position upon the tire, and the structure of the co-operative sliding members being such that their tending to move toward each other, by virtue of the strains exerted by the connected cross chains and side chains, serves to maintain these parts in proper engagement for effective resistance to slackening action of the chain under the action of centrifugal force.

Still another object of the invention is to provide such an adjusting device with a take-up range of about six inches, and so constructed that during the first two inches of the take-up the spring acts under its maximum compression or tension, as the case may be, to reduce the slack very rapidly, and then acts, step by step, under lower compression or tension to take up more gradually the remaining slack and effect the uniform draping of the chain, after which the device acts under still lower compression or tension which is insufficient to cause the cross-chains to bite into the tire enough to prevent the tire chain from creeping on the tire.

A still further object is to provide an adjusting device which forms, virtually, a part of a side chain and to which a pair of the cross-chains are attached, the device being so constructed that said cross-chains may be of the same length as the rest of the cross-chains of the tire chain.

With these and other objects in view which will appear hereinafter I shall now describe several embodiments of my invention and thereafter the scope of the invention will be pointed out in the claims.

In the accompanying drawings:

Figure 1 is a view in elevation of part of an automobile wheel and tire equipped with a tire chain provided with an adjusting device constituting one embodiment of my invention;

Fig. 2 is a plan view of the device of Fig. 1, and connected portions of the side chain, shown separately from the tire;

Fig. 3 is a view in perspective, on a larger scale, of one of the sliding members, and an end part, ready for assembly;

Fig. 4 is a view in perspective of the other sliding member, and its end part and rivet, ready for assembly;

Fig. 5 is a vertical sectional view, taken on the line 5—5 of Fig. 1, on a larger scale;

Fig. 6 is a vertical sectional view taken on the line 6—6 of Fig. 1, on a larger scale;

Fig. 7 is a view of a modification of the adjusting device shown in Fig. 1, with connected portions of the side chain and cross-chains;

Fig. 8 is a similar view of another modification;

Fig. 9 is a view similar to Fig. 1, showing another modified form of adjusting device forming part of the side chain;

Fig. 10 is an assembly view of the aforesaid modification of which Figs. 11, 12, 13, and 14 are views in detail of the different component parts;

Fig. 15 is an assembly view of another embodiment of my invention;

Fig. 16 is a vertical sectional view taken on the line 16—16 of Fig. 15;

Fig. 17 is a view in side elevation of still another embodiment with portions thereof broken away; and Fig. 18 is a view in section taken on the line 18—18 of Fig. 17.

In the embodiment of the invention illustrated in Figs. 1 to 6 inclusive, the parts designated by the reference characters 11 and 12 respectively are elongated members constituting a pair assembled in parallel sliding relation to each other and which may be of any suitable material, length and construction to accomplish the purpose of the invention, being preferably of a suitable length to provide for a range of adjustment amounting to several inches, and preferably arcuate in form, of a radius corresponding aproximately to that of one of the side chains of a tire chain, such as that shown at 13 in Fig. 1, the latter being of conventional or other suitable form, as illustrated, it being understood that there is a similar side chain at the other side of the tire, the two side chains being connected by anti-skid cross chains 14 of any suitable number, connecting the side chains at suitable intervals, extending across the periphery of the tire 15, as usual in said tire chains.

A coil spring 16 surrounds one member of the pair, and part of the other member, bearing at one end against an abutment 17 upon the member 11 and at its other end against an abutment 18 upon the sliding member 12. The spring is suitably coiled to adapt it for compression between the abutments when the members 11 and 12 are extended relatively to each other, the spring thus compressed tending normally to urge the members 11 and 12 into a coextensive or contracted position relatively to each other. The member 11 is provided at its end 19 with means adapting it to be connected with one end 20 of the side chain 13, such connection being illustrated as taking the form of an eye engaged with a link near the end of the side chain. While it is desirable for certain purposes, to be described more at length, that one of the members 11 or 12 shall be connected permanently with one end of the side chain, for convenience in transportation, it will be understood that it is within the spirit of the invention to form the eye as an open hook, if desired. Similarly, it is understood that while it is desirable to provide the other member with an open hook, as indicated at 21, to permit the same to be engaged removably with a selected link near the other end 22 of the side chain 13, it is likewise within the spirit of the invention to establish a permanent connection with that end of the side chain by forming an eye in place of the hook 21.

When formed in the manner illustrated in Fig. 1, the adjusting and tightening device constitutes a permanent part of the tire chain and may be sold as a unitary structure therewith, and when in place upon the tire will serve to tighten the chain thereupon.

In further pursuance of the invention means are provided to prevent positively any relative extension of the members, and consequent slackening of the tire chain in use, such means being adapted to act progressively at frequent intervals along the range of coextensive relative movements between the members 11 and 12.

As the preferred form of such means, the drawings show the sliding member 12 as U-shaped in cross-section, and provided with a series of teeth 24, along the upper surface of the member, with intervening notches between the teeth and an auxiliary squared notch 25 near one end of the member 12.

The member 11 is shown as having its abutment 17 formed as a separate part, provided with an aperture 26, the upper wall of this aperture being formed with a tooth 27 in position to enter the channel of member 12, while the adjacent wall portions are adapted to be engaged with the serrated upper edge 24 of the member 12, the form of the teeth permitting the part 17 to ride over the teeth of the cooperating member as the latter is moved progressively into the co-extensive or contracted position of the members by action of the coiled spring, but opposing movement of the part 17 in the reverse direction, the purpose of this arrangement being to prevent any retrograde movement in the nature of an extension of the members 11 and 12 relatively to each other. Accordingly, when the device is in place upon a tire, the spring acts to take up progressively the slack of the side chain, and the teeth act successively to prevent any slackening of the chain thereafter.

The purpose of the squared notch 25 is to make it possible for an operator, in connecting up the chain, upon emplacement thereof on a tire, to set the members 11 and 12 in the relative position shown in Fig. 7, with the members in fully extended position, the part 17 being engaged with the squared notch 25. The operator will then have a hand free to grasp the free end of the side chain and hook up the same upon the hook 21 at the end of the sliding member 12, and then by depressing that end of the member 12 the members will be freed to act under the expansive action of the spring 16 which will commence to tighten the side chain and keep on until all the slack has been taken up, or until the members 11 and 12 reach the limit of their movement into coextensive position.

I prefer to provide a hook 21 at the free end of the member 11 as illustrated, extending downwardly so that when it rests against the member 17, the hook will be closed and will prevent escape of the link 22 at the free end of the side chain. Accordingly if all the slack of the chain has not been taken up by the adjustive movement, the side chain will nevertheless be prevented from escaping from the device.

In the form illustrated, the hook 21 is formed on a separate part adapted to be inserted within an aperture 28 provided in the bottom of the sliding member 12, the hook part having a notch 29 to receive the rear wall 30 of this bottom aperture and having also a hole 31 to receive a rivet 32 which passes also through holes 33 in the side walls of slide 12 and fastens the hook member 21 firmly in place, as shown in Fig. 1.

In pursuance of a further object of the invention, the members of the device are so interconnected with the side chain and cross chains that the stresses exerted normally by the various chains when in use tend constantly to urge the members 11 and 12 into locking position, and to maintain their interlocked relation, and for this purpose, it is preferred to connect the member 11 wtih two neighboring cross-chains 14ᵃ and 14ᵇ at one end of the series therof, in the manner illustrated, the action of these chains tending to hold the member 11 against radial movement inwardly toward the hub of the wheel, while the action of the side chain 13 upon the ends of the members 11 and 12 is to draw the latter inward toward the hub, thus tending to tilt the members 11 and 12 relatively to each other, and insuring engagement of the part 17 with that one of the series of cooperating teeth 24 opposite which it may be at the time. By this arrangement of parts and interconnection of the various instrumentalities, it is possible to dispense with any springs other than the coiled spring 16, and it will be seen that the only work which the latter has to perform is to take up the slack of the chain, this spring not being relied upon to counteract centrifugal force, which is opposed effectively by the positive action of the cooperating teeth upon the members. This mode of operation makes it possible to provide for rapid and sure locking action of the members in their successive interlocking positions, and to avoid any binding action between the parts.

For the same purpose, the abutment part 18, best shown in Fig. 4, is preferably formed as shown, with a notched portion 35 which rides smoothly on the portion 36 of the member 11, and with lugs 37 which constitute the abutment proper for the spring 16.

It will be apparent that the device may be readily disengaged manually by a simple movement pressing the free end of the slide 12 down to clear the teeth thereon from engagement with the locking member 17, after which the device may be brought forward to an extended position, similar to that shown in Fig. 7, or sufficiently far to permit the end link 22 at the free end of the chain 13 to be disengaged from the hook 21.

The parts 36 and 38 may be connected together by any suitable means, and in the form illustrated in Figs. 1 to 6 they are formed integrally with a connecting portion or web 39 which is provided with an eye at 19 to receive the link 20 of the side chain, and with a slot 40 to receive the connecting hook 41 of the cross-chain 14ᵃ.

At the other end of the part 36, a similar web 42 is provided with a slot 43 to receive the connecting hook 44 of the cross chain 14ᵇ, and the ends 46 are suitably shaped to be riveted firmly in holes 47 in the abutment part 17.

The modification shown in Fig. 7 comprises certain elements which are similar to similarly numbered parts shown in Figs. 1 to 6, and which need not be described again, but the members 11ˣ and 36ˣ are formed separately, for the sake of ease in manufacture, and are provided with extensions 48 and 49, connected by an end piece 50, into which they are riveted as indicated, this modification affording a longer range of adjustment which may be desirable in some installations.

The form shown in Figs. 1 to 6, however, affords means to take up about three and one-half to four inches of slack in the side chain, or approximately the length of two side chain links, which is sufficient ordinarily.

In the modification, shown in Fig. 8, an integral connecting portion 39ˣ is provided with an eye 19ˣ to receive the end link 20 of the side chain, and a web 51 is provided with a slot 52 to receive the connecting hook 41 of one of the cross chains, this web being of a shape adapted to impart rigidity to the structure.

Such a stiffening effect is desirable when the side chain is attached to the extreme left hand end of the device, to counteract the bending moment which is developed as a result of such an attachment.

In the forms shown in Figs. 1 to 7, where the side chain is connected close to one of the cross-chains, no such bending moment develops.

Any of the devices above described may be provided on the outside side chain only, and will operate satisfactorily, it being sufficient to provide the inner side chain, on the other side of the tire, with a plain connecting hook of any suitable conventional type.

The structures shown in the above described figures are all sturdy, simple, inexpensive to manufacture, and reliable in operation.

By connecting two of the cross chains, 14ᵃ and 14ᵇ, to the adjusting device, these cross chains occupy a fixed position relatively to the next cross-chain toward the left, when the device is permanently connected at the left end to the corresponding end of the side chain, and the only change in relative position between any of the cross-chains will take place between the cross-chain 14ᵇ and the next cross chain to the right, viz. the cross-chain which is connected to the free end of the side chain. This conforms to existing practice in the construction of tire chains, and is of advantage both with respect to uniformity in the adjustment and operation of the cross-chains, and in the appearance presented by the adjusted tire chain.

In each of the above forms of the device provision may be made of a thumb piece 55 such as that shown in Fig. 1, which affords a ready means for engagement of thumb or finger of the operator in extending the device at the time of applying the same to the tire; or a suitable thumb-piece may be provided elsewhere, as that shown at 55× in connection with the end-piece 50 in Fig. 7.

It will be observed that, in the case of the forms of Figs. 1–8, one of the sliding members, namely that numbered 12, is connected with the other in such manner that it may operate after the fashion of a cantilever with one point of support against the upper wall of the aperture 26 of the abutment 17 and the other against the part 36 of the member 11. The latter point of support obviously varies in position along the part 36 in accordance with the degree of extension of the slide 12 and the part 36 of the member 11. The member 11 is virtually anchored by the cross chain 14b and that end of the side chain which terminates in the link 20. The line of tension of that end of the side chain which terminates in the link 22 is, when the device is in use, in such a direction as to cause the slide 12 to bear against the upper wall of the aperture 26 in the abutment 17 and against the part 36 of the member 11, thus bringing the cantilever action into play. The effect of this action is to maintain an interlocking engagement of the teeth 24 with the abutment 17 thereby preventing extension of the device and consequent development of slack in the side and cross-chains.

Thus far, several arcuate forms of embodiment of the invention have been illustrated which are particularly useful in application to a side chain of the tire chain, but it is to be understood that the invention may be embodied in various rectilinear forms of devices which may be applied not only to side chains, but also to other portions of the tire chain structure, with notable advantages in operation over existing devices for adjusting tire chains.

Several such devices are illustrated in the drawings.

In Fig. 9 an adjusting device is shown which comprises relatively sliding straight members 61 and 62 which operate in substantially the same manner as the arcuate sliding members 11 and 12 hereinbefore described, the member 61 having at 63 a connecting or web portion provided at 64 with an eye to which is attached the end link 20 of a side chain like that already described and having at 65 a slot to receive the connecting hook 41 of the cross-chain 14a. The other end of this member has at 66 a web provided with a slot 67 to receive the connecting hook 44 of a cross-chain 14b. The member 62 is provided with a hook 68 to receive an end link 22 at the other end of the side chain 13. The coil spring 69 similar to the spring 16 already described surrounds the member 62 and the portion 75 of the member 61, being held under compression between the flange or abutment portion 71 of the member 62 and an abutment part 72 which is riveted upon the member 61, closing the slot 73 within which the spring is placed.

In pursuance of the invention, means are provided for locking the sliding members 61 and 62 together as each of the step-by-step movements is completed in taking up the slack, so that retrograde sliding movement of the members is prevented and no further development of slack can occur.

The means shown for this purpose in the structure illustrated in Figs. 9 to 14 inclusive differs from that already described with respect to the device shown in Figs. 1 to 8, in the respect that the locking device is placed at the inner end of the member 62 and is combined with the abutment part 71 against which the spring 69 bears as already described.

The part 71 is apertured at 74 (see Fig. 11) to afford a loose sliding fit upon the leg 75 of the member 61, and is notched at 76 to receive the upper edge 70 of the lower leg of the member 61, to afford a guiding bearing therebetween.

It is also provided with a portion 77 bent forward at approximately right angles to its abutment portion 71, to form the detent or pawl already mentioned, the free end 78 being bent downwardly to engage with the upper edge 79 of the leg 75 of member 61 which is serrated suitably, as indicated, and the spring 69 tends to rock the part 71 on the leg 75 and thereby to bias the detent into yielding engagement with the teeth 79.

The body portion 80 of the pawl is suitably apertured to receive a hook 81 (see Fig. 14) formed upon the adjacent end of the sliding member 62, so that this pawl device, which also comprises the abutment 71 for the spring, is connected to the sliding member 62 and acts to draw the member 62 toward the left under the expanding action of the spring 69, and when the member 62 is pulled outwardly by the operator, for extension of the device at the time of applying the end link 22 of the side chain to the hook 68, the member 62 draws the abutment 71 with it and places the spring 69 under compression.

After the link 22 has been applied to the hook 68 and the operator has released the member 62, the spring 69 expands and the part 62 is forced toward the left by the spring 69, drawing with it the side chain and taking up rapidly the greater part of the slack, the spring 69 being under maximum compression when the abutment 71 has been drawn to its extreme right hand position.

As the spring continues to expand, and the member 71 moves toward the left, the detent 78 is engaged successively with the teeth 79 which prevent any retrograde movement until all the slack has been taken up, or the detent 78 has reached the position shown in Fig. 10, and the hook 68 bears against the other abutment 72, by which it is closed, and escape of the link 22 is prevented, even though no tension be exerted on the side chain, in the event that the range of take-up action by the device has been insufficient to take up all the slack.

With a device of suitable proportions for the service to be performed, its range of take-up will rarely be exceeded, and the tension exerted on the side chain by the spring 69 will normally be sufficient to prevent escape of the link 22 from hook 69 when they have been initially connected by the operator applying the tire chain to the tire.

It will be understood that prior to extending the device for such application, the detent 78 must be raised above the level of the teeth 79, and this can be done by any suitable instrument available to the operator, as for example by a screw driver, or the member 71 may be provided with a suitable projection or projections, as indicated at 82, to be grasped by the operator for releasing the detent and for moving the part 71 and member 62 toward the right. This may be done by his left hand, while he grasps the link 22 with his right hand and places it upon hook 68.

In the modification illustrated in Figs. 15 and 16, the member 61 is shown as identical with that just described, bearing the same reference characters, but the cooperating sliding member 83 differs from the sliding member 62 in that it is of inverted U-shape in cross-section, for the sake of additional rigidity, and is provided at its left-hand end with an integral bent-over portion 84 which serves as the abutment for the spring 69.

It is also provided with an integral spring tongue or detent 85, stamped out of its upper wall and extending down into the channel in position to be engaged with the teeth 79.

The operation of this modified form of adjusting device is so similar to that of the form just described that further description is unnecessary, but it will be noted that the hook 86 at the outer right-hand end of the member 83 extends upwardly, and that the abutment 87 which is riveted to the member 61, connecting the legs thereof and closing the slot at the right-hand end, is formed with an upwardly and outwardly curved finger 88 which is engaged by the hook 86 when the members 61 and 83 are in their coextensive position shown, preventing escape of the link 22, substantially in the manner already described. It is to be understood that where parts are described as riveted together they may be welded together or otherwise suitably secured together.

The word "coextensive" as used throughout the specification and claims is intended to designate any contracted or non-extended relative position of the sliding members in which they lie side-by-side, even though their ends are not in perfect registry with each other.

The adjusting and tightening device illustrated in Figures 17 and 18 is of arcuate form and in this respect may be classed with the structures shown in Figs. 1 to 8 inclusive. It comprises a pair of arcuate members 90 and 91 assembled in parallel sliding relation, with a spring 92 urging them toward coextensive relation. The member 90 is of tubular form and is adapted to telescope over the member 91. The tube 90 is preferably closed at one end by a wall 93. Adjacent the opposite end of the tube there is a transverse diaphragm 94 formed with an opening 94a therein through which the body of the member 91 slides. This diaphragm is inclined from normal to the axis of the tubular member with its upper side outermost, and it has a lug 95 which projects through a slot 96 in the lower side of the tubular member.

The diaphragm 94 is supported in its inclined position by a portion of an attachment member, as will now be explained. The attachment member is stamped out of sheet metal and is bent to form two mutually spaced bands 97 and 98 with a depending tab portion 99 formed of the two ends of the band. One of the bands 97 snugly embraces the tube, while the other band 98 fits snugly within the tube and is slanted along its inner edge to provide an inclined abutment for the diaphragm 94. The tab parts which connect with the band 98 pass through the slot 96 and bear edgewise against the lug 95. The end of the tube is crimped over the outer edge of the band 98. In this way not only is the attachment device secured firmly to the tube but the diaphragm is also fixed within the tube because its diameter is too great to permit it to swing inwardly on the lugs as a fulcrum and the ring 98 supports it against swinging outwardly.

At the opposite end of the tube there is a similar attachment device comprising a smaller band 101 which fits within the tube and a larger band 102 which fits about the outside of the tube and these two bands are integrally connected with a depending tab 103. The portions of the tab which connect with the band 101 pass through a slot in the lower side of the tube and after the wall 93 has been fitted against the outer edge of the band 101, the adjacent end of the tube is crimped over the wall 93 thereby clamping the attachment device in place.

The slide 91 is very similar in form to the slide 12 shown in Fig. 4. It consists of an arcuate member of U-shape in cross-section, with teeth 105 formed along the upper edge of its two side walls. These teeth like the teeth 24 of the member 12 are inclined toward the outer end of said member and they are adapted to engage the upper edge of the opening 94a in the diaphragm 94. At the inner end of the slide 91 there is a head adapted to slide freely but fairly closely in the tube. This head may be formed by extending the side walls of the slide upwardly as indicated at 106 and extending the bottom wall downwardly as indicated at 107.

Secured to the outer end of the slide 91 is a cross-head providing an upstanding hook portion 108 facing outwardly and a depending hook portion 109 facing inwardly. The spring 92 is detachably connected at one end to the hook 108 while its opposite end is secured to an anchorage 110 welded or otherwise secured to the tube 90. The hook 109, like the hook 21, serves for attachment thereto of an end link 22 of the tire chain 13. The opposite end link 20 of the tire chain is passed through a slot 112 in the tab 113. This slot is of sufficient length to provide also for attachment of a connecting hook 41 of the cross-chain 14a. The tab 99 is also provided with a slot 113 to engage the connecting hook 44 of the cross-chain 14a.

It will be observed that this tightening device differs from those previously described in the fact that the spring employed to urge the two members into coextensive position is a tension spring rather than a compression spring. Also one of the members is of tubular form and consequently a much more rugged construction is provided.

In operation, the spring 92 may be readily slipped off the hook 108 to permit of drawing out the member 91 as far as necessary so as to engage the link 22 with the hook 109. Thereafter the spring is extended and caught over the hook 108. The spring will urge the slide 91 inwardly and the teeth 105 engaging the upper edge of the opening 94a, will prevent outward extension of the slide 91. By reason of the pull of the spring 92 on the hook 108 and of the pull of the side chain on the hook 109 there will be a tendency to tilt the slide 91 on the head 107 as a fulcrum. This will urge the teeth 105 into engagement with the abutment or upper edge of the opening 94a. However, the teeth may be disengaged from said abutment by depressing the outer end of the slide 91.

It is to be noted that with all the various embodiments of my invention illustrated and described above it is possible to use cross-chains of uniform length. This is clearly shown in Figs. 1 and 9 where the points of connection of the cross-chains to the side chain and to the members 11 and 61, in each case, lie on an arc concentric with the wheel. This obviates the necessity of providing shorter chains for connection to the tightening device. In Fig. 1, it will be observed that slots 40 and 43 and the aperture 19 all lie on an arc which is concentric with the arcuate member 11.

The same relative arrangement of slots and aperture is provided in the structure shown in Figs. 7, 8 and 17. In the construction shown in Figs. 9 and 15 the adjusting and tightening device is not of arcuate form and consequently the slots and aperture for attachment of the cross-chains and side chain will lie on a straight line. However, the aperture 64 is so close to the slot 65 that it lies approximately on an arc concentric with the wheel and passing through the points of attachment of the cross-chain hooks 41 and 44. As explained above, the tension of the spring tends to draw the tightening device toward the center of the wheel and this movement is limited by the cross-chains 14ª and 14ᵇ. Such inward urge of the tightening device is the result of the effort of the side chain between the points A and B to assume a straight line. If the aperture 64 were set on the upper side of the member 11 instead of adjacent to the slot 65 such straight line position between points A and B might be satisfied without exerting any pull on the cross-chains 14ª and 14ᵇ provided such cross-chains were of the same length as the cross-chains 14. It is for this reason that the aperture 64 is located substantially on an arc concentric with the wheel and passing through the points of attachment of the hooks 41 and 44. In the case of the structure shown in Fig. 8 where the aperture 19ˣ is remote from the slot 41 the same arcuate disposition is maintained between said aperture and the slots to which the hooks 41 and 44 are connected.

While I have described a number of embodiments of my invention it will be understood that these are to be taken as illustrative and not limitative and that I reserve the right to make such changes in form, construction, and arrangement of parts as may fall within the spirit and scope of the following claims.

I claim:

1. An adjusting and tightening device for tire chains, said device comprising a pair of elongated members assembled in parallel sliding relation, a coiled spring engaged with spaced portions of said sliding members and tending normally, when under compression by said members, to urge said members into a co-extensive position relatively to each other, and means, supported upon one of said members, acting normally to engage the other member and thereby to lock said members together positively to prevent relative extension of said members, said members being adapted to interconnect the end portions of a side chain with adjacent cross-chains in a tire chain, and to be urged into said locking position by the stresses normally exerted upon said members respectively by said side chains and cross-chains when said tire chain is in use.

2. The combination with a tire chain embodying side chains and cross-chains, of an adjusting and tightening device comprising a pair of elongated members assembled in parallel sliding relation and interconnected with certain of said cross-chains and one of said side chains, said members being movable slidingly to tighten said side chain, and also being adapted for relative angular movement into locking engagement with each other, and to be urged into such locking position by the stresses normally exerted upon said members respectively by said side chain and cross-chains when said tire chain is in use, and a coiled spring adapted to actuate said members slidingly to tighten said side chain when in place upon a tire.

3. The combination with a tire chain embodying side chains and cross-chains, of an adjusting and tightening device comprising a pair of elongated members assembled in parallel sliding relation, one member of said pair having spaced regions of its body portion interconnected with two cross-chains and with the adjacent end of one of said side chains, and the other member of said pair having its opposite end adapted to be connected removable with the other end portion of said side chain, said members being movable slidingly to tighten said side chain, and also being adapted for relative angular movement into locking engagement with each other, and to be urged into said locking position by the stresses normally exerted upon said members respectively by said side chains and cross-chains when said tire chain is in use, and a coiled spring to actuate said members.

4. The combination with a tire chain embodying side chains and cross-chains, of an adjusting and tightening device comprising a pair of elongated members assembled in parallel sliding relation, one member of said pair having spaced regions of its body portion interconnected with two cross chains and with the adjacent end of one of said side chains, and the other member of said pair having its opposite end adapted to be connected removably with the other end portion of said side chain, said members being movable slidingly to tighten said side chain, and also being adapted for relative angular movement into locking engagement with each other, and to be urged into said locking position by the stresses normally exerted upon said members respectively by said side chains and cross chains when said tire chain is in use, the tightening action of said device being exerted at a region between only two adjacent cross-chains, while the adjustive effect thereof is distributed throughout the cross-chain components, and a coiled spring to actuate said members.

5. The combination with a tire chain embodying side chains and cross-chains, of an adjusting and tightening device comprising a plurality of elongated members assembled in parallel sliding relation with a coiled actuating spring and interconnected with certain of said cross-chains and one of said side chains, said members being movable slidingly to tighten said side chain, and also being adapted for angular movement into locking relation with each other, and to be urged into said locking position by the stresses normally exerted upon said members respectively by said side chain and cross chains when said tire chain is in use.

6. An adjusting and tightening device for tire chains, said device comprising a pair of elongated members assembled in parallel sliding relation and provided with a coiled spring acting at its ends respectively upon spaced portions of said sliding members and tending normally to urge said members into a coextensive position relatively to each other, one of said members having a series of teeth, and a detent mounted to slide and rock upon one of said members and acting normally to engage certain of said teeth, thereby to prevent relative extension of said members at various regions of their sliding relationship.

7. The combination with a tire chain embodying side chains and cross-chains, of an adjusting and tightening device comprising a plurality of elongated members assembled in parallel sliding relation and provided with a coiled spring acting at its ends respectively upon spaced portions of said sliding members and tending normally to urge said members into a coextensive position relatively to each other, one of said members being connected near one end to an end portion of one of the side chains, and the other member being adapted to be connected at its spaced end removably with the other end portion of said side chain, and one of said members being connected with at least one of said cross chains, and means upon one of said members, acting normally to engage the other member and thereby to prevent positively relative extension of said members, said members being arranged to move freely into said coextensive position under the acting of said spring, to take up slack in said side chain, and being urged into locking position by the stresses normally exerted upon said members respectively by said side chains and cross-chains.

8. An adjusting and tightening device for the side chains and cross-chains of a tire chain, said device comprising a member adapted to be connected with an end of a side chain and also with a cross chain, a second member connected with the first member whereby it is adapted to function after the manner of a cantilever with the first mentioned member as its support, said second member being slidable with relation to the first member, and means adapted to effect an interlocking of said members against extension with respect to each other when tension is exerted in a direction to cause the said second member to function with respect to the first member after the manner of a cantilever.

9. An adjusting and tightening device for the side chains and cross chains of a tire chain, said device comprising a member adapted to be connected with an end of a side chain and also with a cross chain, a second member connected with the first member whereby it is adapted to function after the manner of a cantilever with the first mentioned member as its support, said second member being slidable with relation to the first member, means adapted to effect an interlocking of said members against extension with respect to each other when tension is exerted in a direction to cause the said second member to function with respect to the first member after the manner of a cantilever, and a spring connecting said members and acting to urge said members into coextensive position.

10. An adjusting and tightening device for the side chains and cross-chains of a tire chain, said device comprising a member adapted to be connected with an end of a side chain and also with a cross chain, a second member connected with the first member whereby it is adapted to function after the manner of a cantilever with the first mentioned member as its support, said second member being slidable with relation to the first member, means adapted to effect an interlocking of said members against extension with respect to each other when tension is exerted in a direction to cause the said second member to function with respect to the first member after the manner of a cantilever, and a spring connecting said members acting by expansion to urge said members into coextensive position.

11. An adjusting and tightening device for tire chains, said device comprising a pair of members assembled in sliding relation, said members being adapted to interconnect the end portions of a side chain with adjacent cross-chains and to be urged into an interlocked relation with each other and there maintained by the stresses normally exerted on said members respectively by said side chains and cross-chains when said tire chain is in use, to prevent the development of slack in the tire chain.

12. An adjusting and tightening device for tire chains, said device comprising a pair of elongated members assembled in parallel sliding relation, a spring urging said members into coextensive position relatively to each other, and means on one of the members adapted to engage the other member to lock the members against relative extension, said members being adapted to interconnect the end portions of one of the side chains with two of the adjacent cross-chains, and said means being adapted to be urged into locking position by the stresses normally exerted upon said members respectively by said side chains and cross-chains when said tire chain is in use.

13. An adjusting and tightening device for a tire chain embodying side chains and cross-chains, said device comprising a tubular member having a closed end and an open end, a slide member adapted to slide in the tubular member, a cross head fixed to the outer end of the slide member providing a pair of opposed hooks, a tension spring secured at one end to the tubular member near the closed end thereof, the opposite end of the spring being adapted to be hooked over one of said hooks, the other hook serving for detachable connection to one end of a side chain of the tire chain, means on the tubular member for interconnecting the other end of said side chain with a pair of the cross-chains, an abutment in the tubular member near the open end thereof, and ratchet teeth formed on the slide member and adapted to engage the abutment to prevent relative extension of the members, said spring serving to tilt the slide member on its inner end as a fulcrum and thereby press the toothed surface into engagement with said abutment.

14. A device of the character described comprising an arcuate tubular member, an arcuate slide member freely slidable in the tubular member and also capable of limited oscillation with respect to the tubular member, said members being adapted for connection to opposite end portions of a tire chain, the slide being formed with outwardly inclined ratchet teeth along its inner arcuate surface, the tube being formed with an abutment to engage the teeth and prevent relative extension of the members, and a tension spring extending in chordal direction and connecting the extremities of the members, said spring urging the members toward coextensive position and by reason of its chordal disposition urging the toothed surface of the slide against the abutment.

15. A device of the character described comprising an arcuate tubular member, an arcuate slide member freely slidable in the tubular member and also capable of limited oscillation with respect to the tubular member, said members being adapted for connection to opposite end portions of a tire chain, coacting ratchet means on the two members permitting movement of the members toward coextensive position but preventing relative extension thereof, a tension spring extending in chordal direction and connecting the extremities of the members, said spring urging the members toward coextensive position and at the same time urging the members to relative angular position to hold the ratchet means in operative engagement.

16. The combination with a tire chain embodying side chains and cross-chains, of an adjusting and tightening device comprising a pair of elongated members assembled in parallel sliding relation, one member of said pair having spaced regions of its body portion interconnected with two of the cross-chains and with the adjacent end of one of said side chains, the other member of said pair having its opposite end adapted to be connected with the other end portion of said side chain, others of the cross-chains being directly connected to said side chain, the points of connection of said end chain to said first named member and of the cross chains to said first named member and to said side chain all lying in substantially the same arc when said tire chain is in use, a spring tending to slide the members in a direction to tighten said chains and take-up means for preventing relative extension of said members.

17. The combination with a tire chain embodying side chains and cross-chains, of an adjusting and tightening device comprising a pair of elongated arcuate members assembled in parallel sliding relation, one of said pair having spaced regions of its body portion interconnected with two of said cross-chains and with the adjacent end of one of said side chains, the points of connection of the cross-chains and side chain with said member lying in an arc substantially concentric with said arcuate members, the other member of said pair having its opposite end adapted to be detachably connected with the other end portion of said side chain, a spring tending to slide said members in a direction to tighten said side chain, and take-up means for preventing relative extension of said members.

18. The combination with a tire chain embodying side chains and cross-chains, of an adjusting and tightening device comprising a pair of elongated members assembled in parallel sliding relation, one of the members being connected at one end to one of the side chains, the other member having its opposite end adapted for detachable connection with the other end portion of said chain, two of the cross-chains being connected to the first named member at spaced points thereon and others of the cross chains being connected directly to said side chain, the relative points of connection of the cross-chains and end chain to said first named member being such that cross-chains of uniform length may be employed throughout the tire chain, a spring tending to slide said members in a direction to tighten side chain, and take-up means for preventing relative extension of said members.

19. An adjusting and tightening device for a tire chain embodying side chains and cross chains, said device comprising a pair of relatively slidable parts adapted for connection respectively to the opposite ends of one of said side chains between the points of attachment of the latter to two of the cross chains, a spring tending to draw the ends toward each other and toward a chordal line connecting said points, means for attaching the device to an intermediate one of the cross chains to restrain movement of said ends toward such chordal line, and take-up means on said parts cooperating to lock said parts against relative extension, said take-up means being urged into locking position by the stresses normally exerted upon said parts by the side chain and said intermediate cross chain when the tire chain is in use, the points of connection of the device to said side chain and the intermediate cross chain being so related as to position that the latter may be of the same length as the rest of the cross chains.

20. An adjusting and tightening device for a tire chain embodying side chains and cross-chains, said device comprising relatively slidable parts adapted for connection respectively to the opposite ends of one of said side chains between the points of attachment of the latter to two of the cross-chains, a spring acting on said parts to draw said ends toward each other and toward a chordal line connecting said points, means for attaching the device to an intermediate pair of the cross-chains to restrain movement of said ends toward such chordal line, and take-up means cooperating to lock said parts against relative extension, said take-up means being urged into locking position by the stresses normally exerted upon said parts by the side chain and said intermediate pair of cross-chains, the points of connection of the device to the side chain and the pair of intermediate cross-chains being so located that the latter may be of the same length as the rest of the cross-chains.

21. An adjusting and tightening device for a tire chain embodying side chains and cross-chains, said device comprising relatively slidable parts adapted for connection respectively to the opposite ends of one of said side chains between the points of attachment of the latter to two of the cross-chains, a spring acting on said parts to draw said ends toward each other and toward a chordal line connecting said points, means for attaching one of the parts to an intermediate pair of the cross-chains to restrain movement of said ends toward such chordal line, and take-up means cooperating to lock said parts against relative extension, said take-up means being urged into locking position by the stresses normally exerted upon said parts by the side chain and said intermediate pair of cross-chains, the points of connection of the device to the side chain and the pair of intermediate cross-chains being so located that the latter may be of the same length as the rest of the cross-chains.

22. An adjusting and tightening device for a tire chain assembly embodying side chains and cross-chains, said device comprising a pair of elongated members assembled in parallel sliding relation, means at one end of the device for attachment of an end of one of the side chains to one of the members, means at the other end of the device for attachment of the other end of the side chain to the adjacent end of the other member, a spring urging said members into coextensive position relatively to each other, ratchet teeth on one of the members, a shoulder on the other member at the end remote from its attachment to the side chain for engaging the ratchet teeth to lock the members against relative extension, and means on the shouldered member and on the end thereof adjacent said shoulder for attachment to a cross-chain of the tire chain.

JOHN R. REYBURN.